(12) United States Patent
Rao et al.

(10) Patent No.: US 10,043,289 B1
(45) Date of Patent: Aug. 7, 2018

(54) AUTOMATIC CENTROID DETERMINATION OF MICROLENS ARRAYS IN PLENOPTIC IMAGING SYSTEMS

(71) Applicants: Krishna Prasad Agara Venkatesha Rao, Bangalore (IN); Srinidhi Srinivasa, Bangalore (IN)

(72) Inventors: Krishna Prasad Agara Venkatesha Rao, Bangalore (IN); Srinidhi Srinivasa, Bangalore (IN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/453,882

(22) Filed: Mar. 8, 2017

(51) Int. Cl.
*H04N 9/097* (2006.01)
*G06T 7/80* (2017.01)
*H04N 5/225* (2006.01)
*G06T 7/73* (2017.01)
*G06K 9/46* (2006.01)

(52) U.S. Cl.
CPC .............. *G06T 7/80* (2017.01); *G06K 9/4638* (2013.01); *G06T 7/74* (2017.01); *H04N 5/2258* (2013.01)

(58) Field of Classification Search
CPC .......... G06T 7/002; G06T 7/80; H04N 5/2258
USPC .......................... 382/140, 294, 154; 356/228
See application file for complete search history.

(56) References Cited

U.S. PATENT DOCUMENTS 9,153,026 B2 * 10/2015 Meng .................. H04N 17/002
9,613,417 B2 * 4/2017 Namboodiri ............. G06T 7/80
2016/0260205 A1   9/2016 Namboodiri et al.

\* cited by examiner

*Primary Examiner* — Michael Lee
*Assistant Examiner* — Jean W Desir
(74) *Attorney, Agent, or Firm* — Fenwick & West LLP

(57) ABSTRACT

One aspect determines centroids of a plenoptic image, which correspond to the center view of the plenoptic image. A search band spanning a range of different values along a search direction (e.g., range of $\Delta y$) is determined. Multiple slices of the plenoptic image are taken at different values of the search coordinate (i.e., different y values). Because the plenoptic image has a periodic structure imposed by the periodicity of the microlens array, each slice will have a strong frequency component at this fundamental frequency. A slice corresponding to the centroid location (i.e., value of y at the centroid) is selected based on analysis of these frequency components. In one approach, the slice with the weakest component at this fundamental frequency is selected as the centroid. A similar approach can be performed in the orthogonal direction to obtain the two-dimensional coordinates of the centroids.

20 Claims, 9 Drawing Sheets

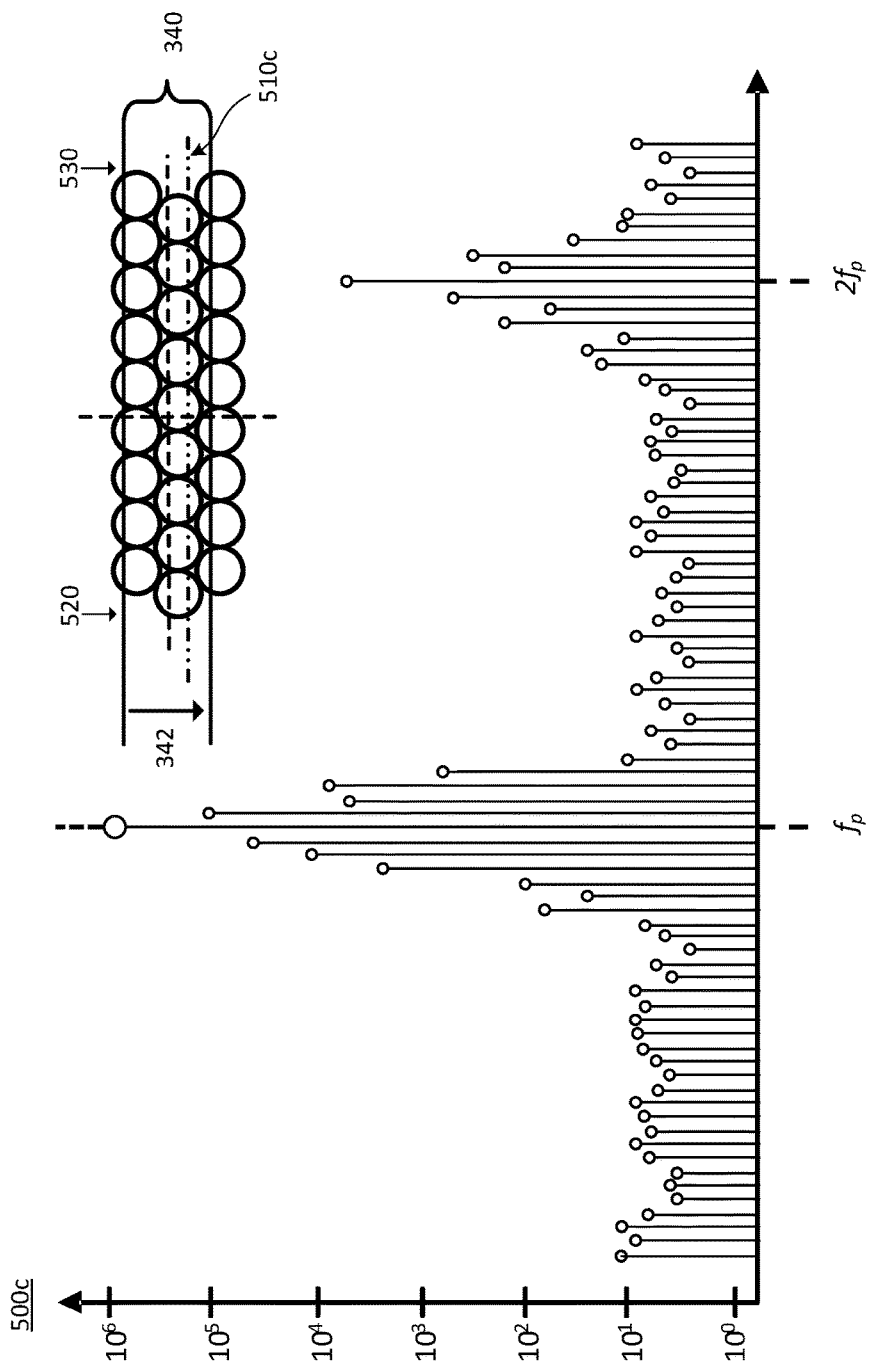

AUTOMATIC CENTROID DETERMINATION OF MICROLENS ARRAYS IN PLENOPTIC IMAGING SYSTEMS

BACKGROUND OF THE INVENTION

1. Field of the Invention

This disclosure relates generally to the calibration and/or characterization of plenoptic imaging systems.

2. Description of the Related Art

The plenoptic imaging system has recently received increased attention. It can be used to recalculate a different focus point or point of view of an object, based on digital processing of the captured plenoptic image. The plenoptic imaging system also finds application in estimating depth to three-dimensional objects that are imaged by the plenoptic imaging system, possibly followed by three-dimensional reconstruction of those objects or the entire three-dimensional scene.

However, the architecture of a plenoptic imaging system is different from that of a conventional imaging system, and therefore requires different calibration and processing procedures. Many plenoptic imaging systems use an array of microlenses. The plenoptic image captured by the plenoptic imaging system can be processed to create multiple images of the object taken from different viewpoints. The highest quality views from these plenoptic imaging systems are generally associated with the center of each microlens. Assuming a perfect mapping of a microlens array to the underlying sensor array can yield an estimate of the center view of a plenoptic image. However, in practice, microlens arrays are rarely perfectly aligned with the sensor array capturing the plenoptic image and detecting which sensors correspond to the high quality center view, which is typically the best view for each microlens, can be difficult.

Thus, there is a need for better approaches to determine which are the center view sensors for a plenoptic imaging system.

SUMMARY OF THE INVENTION

The present disclosure overcomes the limitations of the prior art by providing a procedure to determine the center view for a plenoptic imaging system.

One aspect determines centroids of a plenoptic image, which correspond to the center view of the plenoptic image. A raw plenoptic image is captured using the imaging optics and sensor array of a plenoptic imaging system. The raw plenoptic image preferably is normalized. The normalization may scale the pitch of the plenoptic image and also may remove rotation of the microlens array relative to the sensor array.

The centroid along a search direction (e.g., along the y-axis) is determined, as follows. A search band spanning a range of different values along the search direction (e.g., range of Δy) is determined. In one approach, the search band may span a range of values around a center sensor of the sensor array. Multiple slices of the plenoptic image are taken at different values of the search coordinate (i.e., different y values). Each slice is, generally, a row (or column) of sensors of the sensor array. Because the plenoptic image has a periodic structure imposed by the periodicity of the microlens array, each slice will have a strong frequency component at this fundamental frequency. A slice corresponding to the centroid location (i.e., value of y at the centroid) is selected based on analysis of these frequency components. In one approach, the slice with the weakest component at this fundamental frequency is selected as the centroid. A similar approach can be performed in the orthogonal direction to obtain the two-dimensional coordinates of the centroids. These coordinates can be mapped back to the raw sensor coordinates by applying the inverse of the normalization process.

In another aspect, candidate arrays of centroids are generated using different packing structures (hexagonally packed, square packed, etc.). By analyzing the plenoptic image relative to the candidate packing structures, the actual packing structure is determined.

Other aspects include components, devices, systems, improvements, methods, processes, applications, computer readable mediums, and other technologies related to any of the above.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 5A-5C are power spectral diagrams illustrating how power at the fundamental frequency varies between slices, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
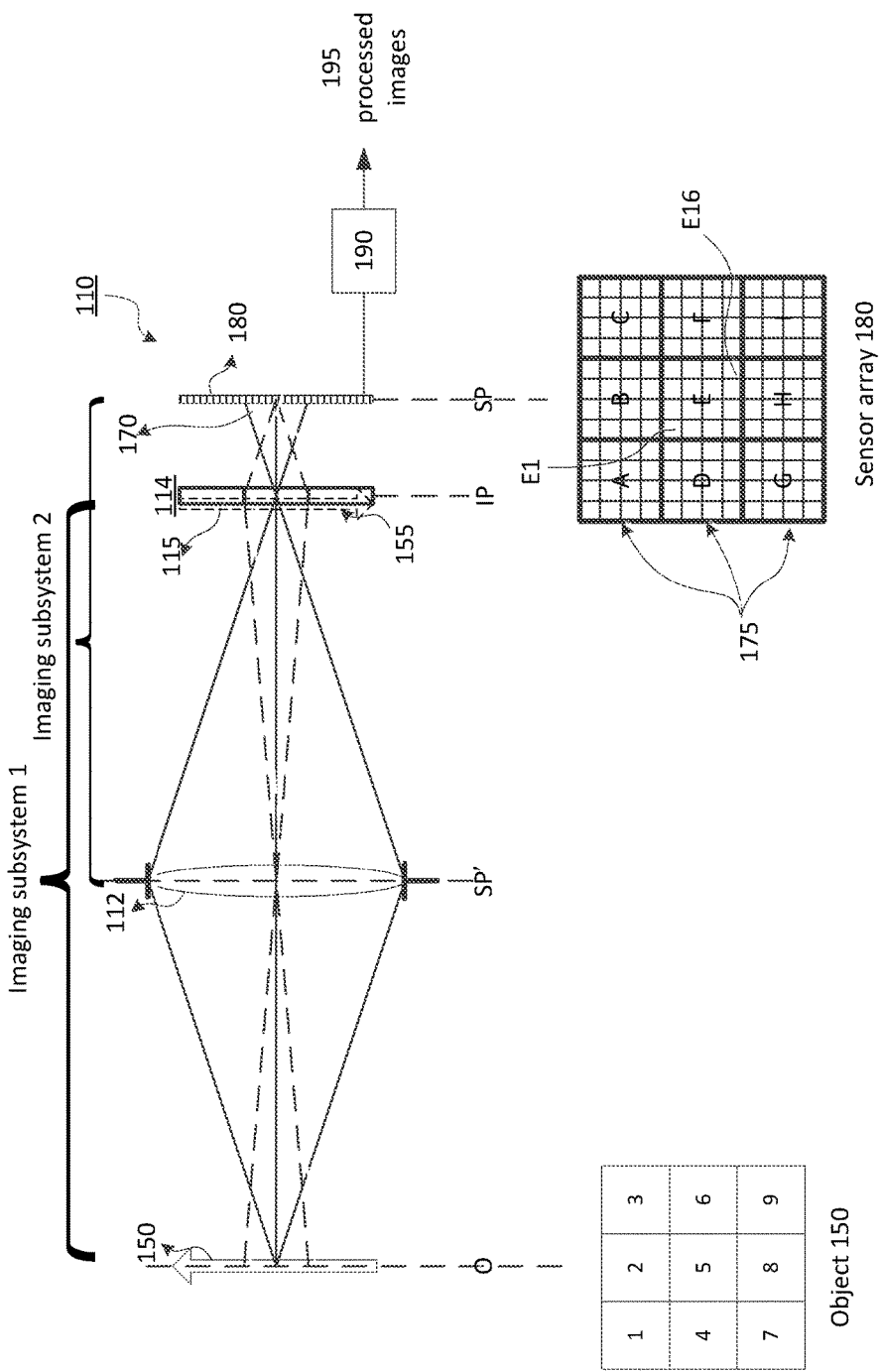
FIG. 1 (prior art) is a diagram of a plenoptic imaging system.

FIG. 1 (prior art) is a diagram illustrating a plenoptic imaging system. The plenoptic imaging system 110 includes imaging optics 112 (represented by a single lens in FIG. 1), a microlens array 114 (an array of microlenses 115) and a sensor array 180. The microlens array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microlens array 114 is located at the image plane IP, and each microlens images the aperture of imaging subsystem 1 onto the sensor array 180. That is, the aperture and sensor array are located at conjugate planes SP and SP'. The microlens array 114 can be a rectangular array, hexagonal array or other types of arrays. The sensor array 180 is also shown in FIG. 1.

The bottom portion of FIG. 1 provides more detail. In this example, the microlens array 114 is a 3×3 array of microlenses 115. The object 150 is divided into a corresponding 3×3 array of regions, which are labeled 1-9. Each of the regions 1-9 is imaged by the imaging optics 112 and imaging subsystem 1 onto one of the microlenses 114. The dashed rays in FIG. 1 show imaging of region 5 onto the corresponding center microlens.

Each microlens 115 images these rays onto a corresponding section of the sensor array 180. The sensor array 180 is shown as a 12×12 rectangular array. The sensor array 180 can be subdivided into microlens footprints 175, labelled A-I, with each microlens footprint corresponding to one of the microlenses and therefore also corresponding to a certain region of the object 150. In FIG. 1, microlens footprint E corresponds to the center microlens, which corresponds to region 5 of the object. That is, the sensors within microlens footprint E capture light from region 5 of the object.

Each microlens footprint contains many individual sensors. In this example, each microlens footprint 175 has a 4×4 array of individual sensors 177. Each sensor within a microlens footprint captures light from the same region of the object, but at different propagation angles. For example, the upper left sensor E1 in microlens footprint E captures light from region 5, as does the lower right sensor E16 in microlens footprint E. However, the two sensors capture light propagating in different directions from the object. This can be seen from the solid rays in FIG. 1. All three solid rays originate from the same object point but are captured by different sensors within the same microlens footprint. That is because each solid ray propagates along a different direction from the object.

In other words, the object 150 generates a four-dimensional light field L(x,y,u,v), where L is the amplitude, intensity or other measure of a ray originating from spatial location (x,y) propagating in direction (u,v). Each sensor 177 in the sensor array captures light from a certain volume of the four-dimensional light field. The sensors are sampling the four-dimensional light field. The shape or boundary of such volume is determined by the characteristics of the plenoptic imaging system.

In certain plenoptic imaging system designs, the sample volumes are hyperrectangles. That is, every sensor within a microlens footprint captures light from the same rectangular (x,y) region associated with the microlens footprint 175, and each sensor 177 within the microlens footprint captures light from a different rectangular (u,v) region. However, this is not always the case. For convenience, the microlens footprints will be described as capturing light from a certain region of the object 150 (even though sensors within that microlens footprint may capture light from slightly different regions), and the sensors will be described as capturing light from a certain range of propagation directions (even though the range may be different for different sensors, or even for different (x,y) points captured by the same sensor). Regardless of the details, the plenoptic imaging system creates a plenoptic image 170, which maps (x,y) spatial locations and (u,v) propagation directions to sensors in the array 180. This is in contrast to a conventional image, which maps (x,y) spatial locations to sensors but loses information about the (u,v) propagation directions.

Because the plenoptic image 170 contains information about the four-dimensional light field produced by the object, the processing module 190 can be used to perform different types of analysis, such as depth estimation, three-dimensional reconstruction, synthetic refocusing, extending the depth of focus, spectral analysis and other types of multi-view analysis.

However, many of these analyses depend on the mapping from the light field coordinates (x,y,u, and v) to the individual sensors. That is, each individual sensor captures a certain volume of the four-dimensional light field. Having an accurate knowledge of which sensor captures which volume is important for good processing of the captured plenoptic image. For convenience, the (x,y) region that maps to a sensor will be referred to as the light field viewing region for that sensor, and the (u,v) region that maps to a sensor will be referred to as the light field viewing direction for that sensor.

The footprint is the aggregate of all sensors that have the same light field viewing region. The view is an analogous concept for propagation direction. The view is the aggregate of all sensors that have the same light field viewing region. In the example of FIG. 1, the individual sensors A1, B1, C1, . . . I1 make up the upper left view of the object. The individual sensors A16, B16, C16, . . . I16 make up the lower right view of the object. The center view is the view that corresponds to (u,v)=(0,0), assuming that the plenoptic imaging system is an on-axis symmetric system. The centroid of each footprint is the point in the footprint that corresponds to (u,v)=(0,0). In FIG. 1, the centroid of each footprint 175 is the center intersection that is labelled A, B, C, . . . I.

FIG. 1 is an ideal situation, in which each footprint contains exactly 16 sensors and the centroid of each footprint is easily determined. In real systems, this typically is not the case. The shape of the primary optics 112 and microlens array 114, manufacturing and assembly tolerances especially misalignment of the microlens array 114 relative to the sensor array 180, vignetting and aberrations may all cause degradation from the ideal situation. As a result, the actual footprints and their centroids may be misaligned with the underlying sensor array. Nonetheless, many plenoptic analyses depend on determining the location of the centroid or center view. Assuming an ideal situation when that is not the case will lead to errors in later analyses.

Figure 2:
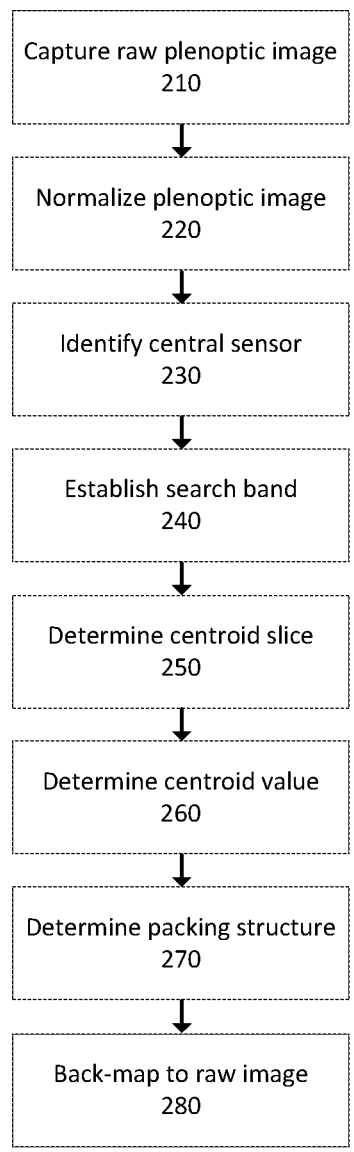
FIG. 2 is a flow diagram of one method for determining a centroid location of a normalized plenoptic image, according to one example embodiment.

FIG. 2 is a flow diagram of one method for determining a centroid location of a normalized plenoptic image and, optionally, also the packing structure of the microlens array of the plenoptic image system. This process is explained with reference to FIGS. 3-7. For convenience, the sensor located at the centroid location will be referred to as the centroid sensor. In one embodiment, the process of FIG. 2 is performed by the plenoptic imaging system 100 (e.g., via the processing module 190). In another embodiment, the process is performed by a computing system separate from the plenoptic imaging system. Other modules may perform some or all of the steps of the process in other embodiments.

Likewise, embodiments may include different and/or additional steps, or perform the steps in different orders.

Figure 3A:
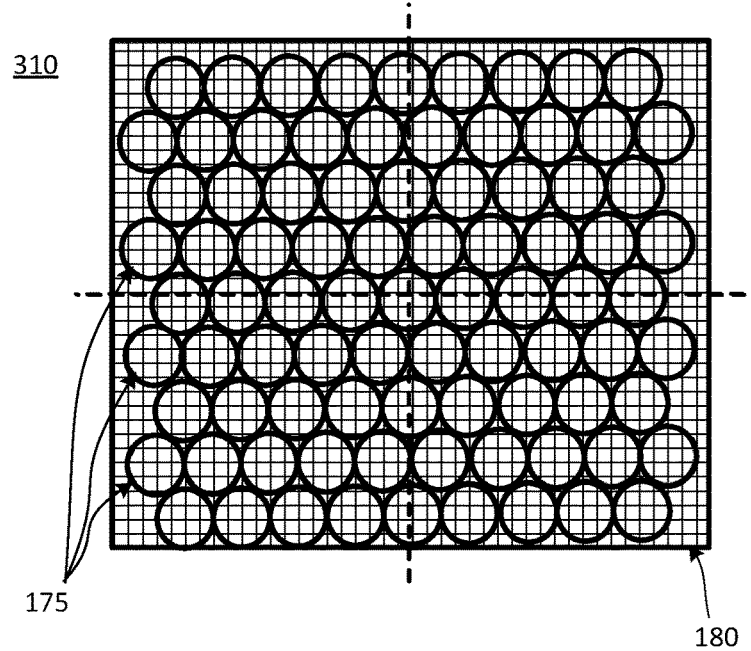
FIG. 3A is an illustration of a raw plenoptic image and FIG. 3B is an illustration of a normalized version of the plenoptic image of FIG. 3A, according to one example embodiment.
Figure 3B:
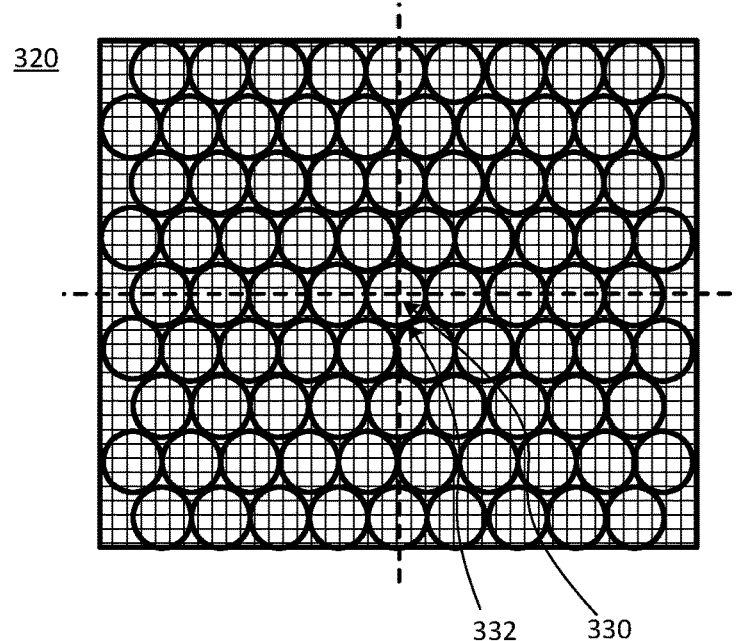

The plenoptic imaging system 100 captures 210 a raw plenoptic image of a calibration object and normalizes 220 that image. FIG. 3A is an illustration of the raw plenoptic image 310 and FIG. 3B is an illustration of the normalized version 320 of that image. In some embodiments, the plenoptic imaging system captures a raw plenoptic image of an object that is uniformly illuminated (e.g., a white card that when imaged fills the sensor array 180). More generally, the calibration object preferably is uniformly lit and does not include characteristics (e.g. patterns, features or other high frequency content) that can create optical discrepancies in the captured plenoptic image due to the microlens array configuration. As discussed above, each microlens 115 forms an image of the pupil at the sensor plane SP. The area occupied by the image of the pupil is referred to as the microlens footprint 175. Accordingly, a raw plenoptic image generated in the manner described above is a two-dimensional array of images occupying microlens footprints, one for each microlens.

In FIG. 3A, these microlens footprints 175 are largely round (as opposed to the square footprints shown in FIG. 1) because the pupil for the primary optics 112 is round. There may be some change in shape due to field effects, vignetting or aberrations. In addition, the microlens footprints 175 may not be fully aligned with the underlying sensor array 180. In FIG. 3A, the sensor array 180 is the square array. Each square represents an individual sensor in the array. Note that the plenoptic image (i.e., the microlens footprints 175) are rotated relative to the sensor array 180.

The raw plenoptic image 310 is normalized 220, generating the normalized plenoptic image 320 of FIG. 3B. In this example, the image is normalized by removing the rotation. The normalization process also determines the diameter of each normalized footprint and the pitch between normalized footprints.

In alternate embodiments, the normalization 220 may also normalize the shape of the footprints (e.g. changing the shape of a microlens footprint from ovoid to circular), the size of the footprints (e.g., making all the microlens footprints have a same size, pitch or area). In some configurations, the normalization process can maintain some variation in size, shape and position of the normalized footprints.

In one example, the normalization process 220 operates as followed. Different one-dimensional slices through the raw plenoptic image are analyzed. A slice is a row of sensor data which has been upscaled based on the precision requirement for the pitch (e.g., 8×, 16× upscale). The one with the Fourier transform (e.g., discrete Fourier transform) having the highest spectral power is selected. "Highest" power typically is implemented as the slice with the highest spectral power in its fundamental component. In one approach, this is achieved by first considering slices at different offsets within a row of microlens footprints. The slices are parallel to each other and span the row of microlens footprints. The slice with the highest spectral power (e.g., a stronger fundamental component compared to other slices) is selected. The raw plenoptic image is then rotated to different angles relative to the selected slice to produce a second plurality of slices with different rotations. Again, the slice with the highest spectral power is selected.

The selected slice is used to determine the pitch and rotation of that portion of the plenoptic image relative to the sensor array 180. The pitch is determined based on a fundamental frequency of the Fourier transform of the selected slice. For example, pitch may be determined by dividing a fundamental frequency associated with the highest spectral power by a size of the sample. In some embodiments, the size of the sample takes into account spectral leakage.

The rotation is determined based on the rotation of the selected slice. The rest of the plenoptic image may be assumed to have the same pitch and rotation. Alternately (and optionally), the process may be repeated for different locations in the plenoptic image (i.e., different rows of microlens footprints) to determine the pitch and rotation for each location. For example, where the slice is for a row that spans the entire plenoptic image, it may be assumed that the pitch and rotation are constant across the entire row. Alternatively, there may be multiple slices used to span the entire plenoptic image. In that case, a different pitch and rotation may be determined for each of the multiple slices (i.e., a piecewise solution). Interpolation can also be used when there are multiple sample points. Pitch may also be determined for different directions. The pitch in x and y may be different due to hexagonal packing but the other pitch can be determined using simple geometry.

Further details are described in U.S. patent application Ser. No. 14/638,907 filed Mar. 4, 2015, titled "Calibration of Plenoptic Imaging Systems Using Fourier Transform," which is incorporated by reference herein.

Returning to FIG. 2, the center sensor 330 of the center footprint of the normalized image is identified 230. In one approach, the center sensor is the sensor nearest the geometric center of the normalized image 320 and the center footprint 332 can be the normalized footprint nearest the geometric center of the normalized image. In FIG. 3B, the geometric center of the sensor array is indicated by the intersection of the two dashed lines.

For example, the normalized image may be N×M pixels (e.g. 1024×2048). Let the sensor array be described as S(i,j) where i is the row of the sensor and j is the column of the sensor in an N×M sensor array where $1 \leq i \leq N$ and $1 \leq j \leq M$. Thus, the center sensor will be the sensor at the position $S((N+1)/2, (M+1)/2) = S(512.5, 1024.5)$.

In other embodiments, the center sensor 330 can be selected via alternative methods: based on the signal power of the center footprint 332, based on the frequency response of the center footprint, based on the power of sensor rows and columns of the normalized image, based on the frequency response of sensor rows and columns of the normalized image, or any other suitable method for determining a center sensor of a sensor array.

Figure 4A:
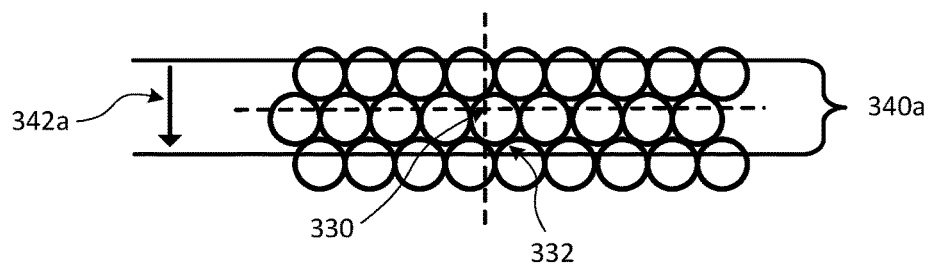
FIGS. 4A-4C illustrate search bands for different search directions, according to one example embodiment.
Figure 4B:
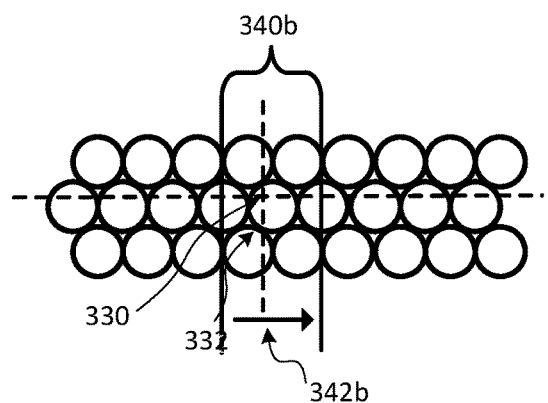
Figure 4C:
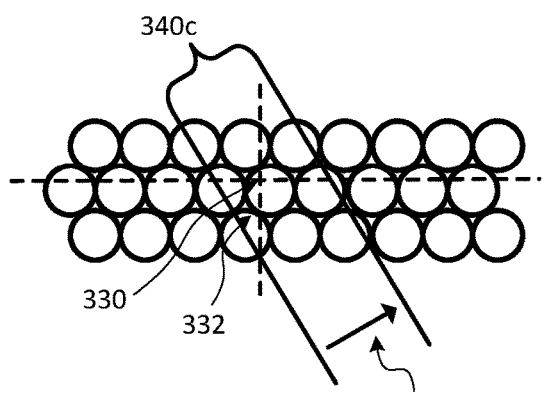

A search band is established 240 around the center sensor 330 of the sensor array. The search band spans a range of different values along a search direction. FIGS. 4A-4C illustrate search bands 340a-c along different search directions. In these figures, the center sensor 330 is located at the intersection of the two dashed lines. The center footprint 332 is the circle containing the center sensor 330. The search direction is shown by the arrow 342a-c and the search band is 340a-c.

Using the pitch obtained during calibration of the raw plenoptic image, the system selects a search band 340 about the center sensor 330 extending along the search direction 342. Generally, the search direction 342 is parallel to the sensor rows or sensor columns of the sensor array. For example, if the search direction 342 is parallel to the columns of sensors in the sensor array (as shown in FIG. 4A) and the center sensor is S(512,1024) of a 1024×2048 normalized image, the search band can be the eight rows of sensors on opposite sides of the $512^{th}$ row of sensors, i.e. S(504,xxx)→S(520,xxx) where xxx indicates a range of values for each row. Similarly, if the search direction is parallel to the rows of sensors in the sensor array (as shown in FIG. 4B) and the center sensor is S(512,1024), the search band can be the ten columns of sensors on opposite sides of the $1024^{th}$ column of sensors, i.e. S(xxx,1014)→S(xxx, 1034).

While the search band is preferably orthogonal to the rows and columns of the search direction, search bands in any number of search directions can be used, for example see FIG. 4C. The search band preferably is wide enough that it will contain the centroids of the microlens footprints. Preferably, the search band is between 1× and 2× the pitch of the footprints in the normalized plenoptic image.

The system considers different slices through the search band 340 and determines 250 which slice goes through the centroid. This slice will be referred to as the centroid slice. The slices extend in a direction orthogonal to the search direction. Generally, each slice corresponds to one row (or column) of sensors within the search band of rows (or columns), but can also include a larger number of sensor rows within the search band. The sensor data for the slices within the search band are analyzed and the centroid slice is selected based on this analysis. For example, the system may take a discrete Fourier transform (DFT) of each slice and compare the DFTs of each slice within the search band to determine which is the centroid slice. In one approach, the selection is based on the frequency component at the fundamental pitch frequency for the plenoptic image. In a more specific example, the selection may be based on the frequency component at the fundamental pitch frequency for the plenoptic image with the minimum power.

Figure 5A:
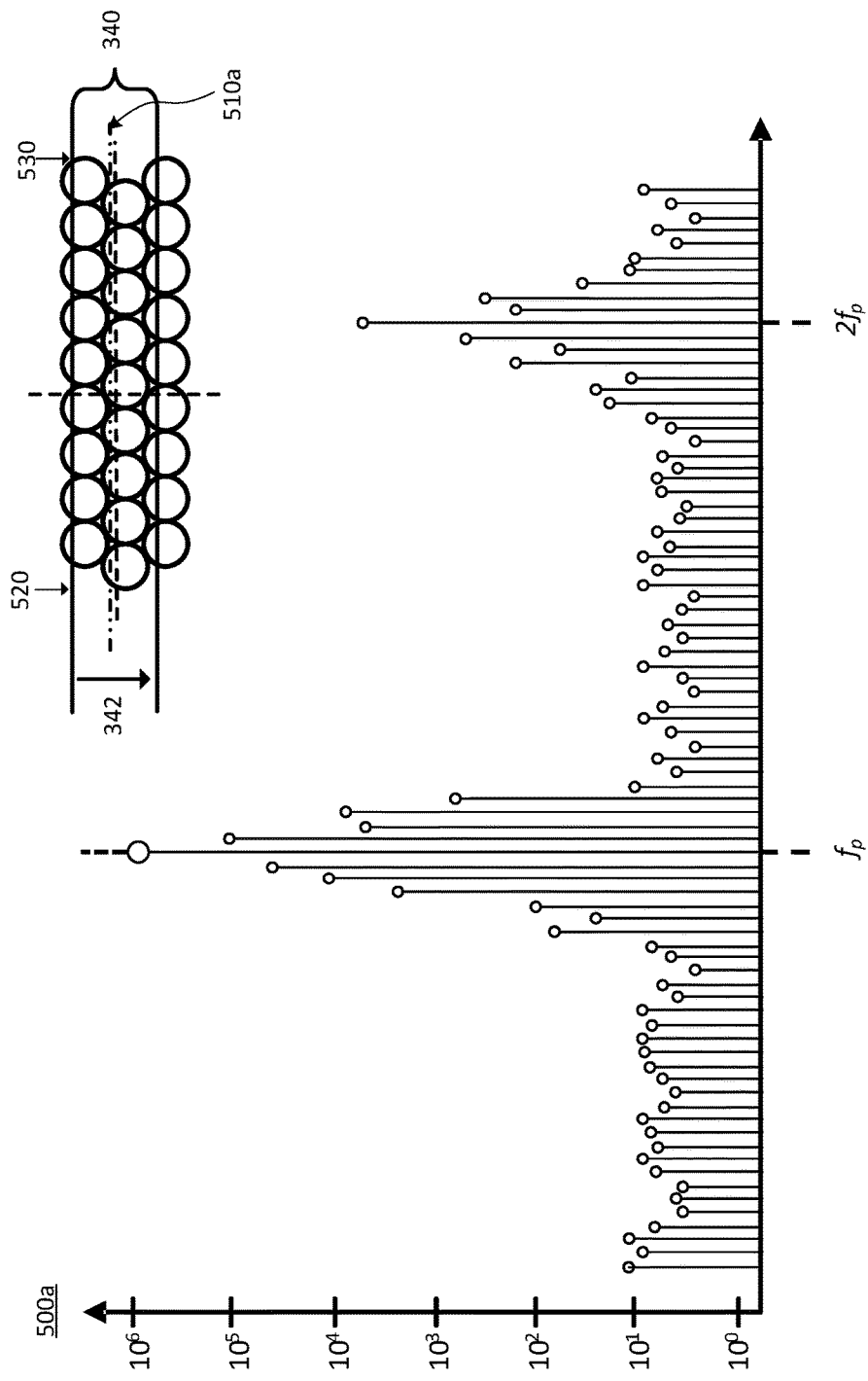
Figure 5B:
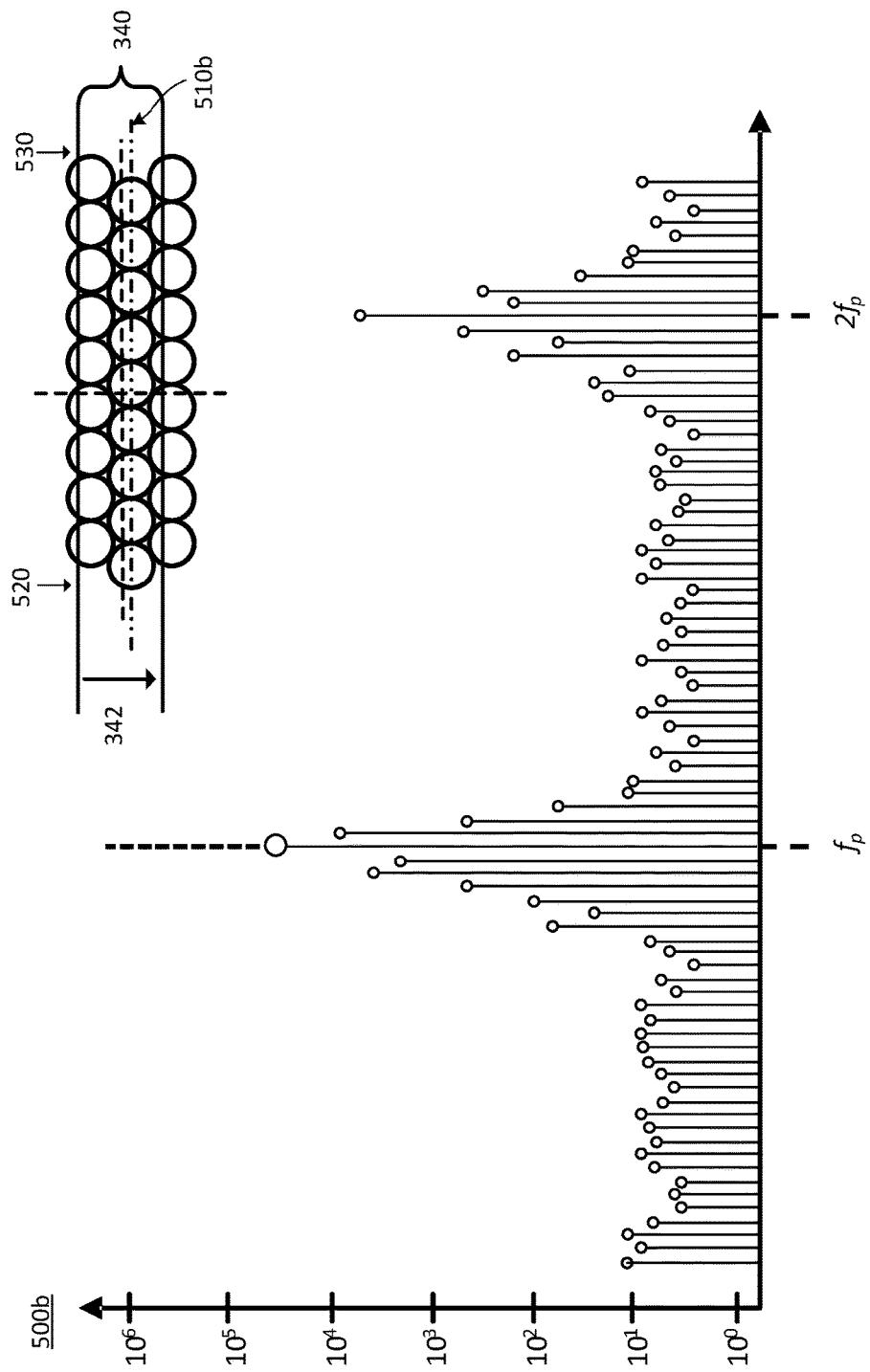

The spectral power distribution of a slice varies with its offset within a search band. FIGS. 5A-5C are power spectral diagrams illustrating how power at the fundamental frequency varies from slice to slice, according to one example embodiment. The normalized plenoptic image 320 and search band 340 from FIG. 4A is reproduced in each of these figures. Each figure shows a different slice 510a-c through the plenoptic image. In FIG. 5A, the slice 510a is above the centroid location. In FIG. 5B, the slice 510b is at the centroid location, which is through the center of the row of circular footprints. In FIG. 5C, the slice 510c is below the centroid location. Each figure also contains a power spectral diagram 500a-c showing the power as a function of frequency for the slice. $f_p$ is the fundamental frequency corresponding to the pitch of the footprints.

The normalized plenoptic image 320 is a mostly periodic array of footprints, which are images of the pupil. Referring to the normalized plenoptic images in FIG. 5, because the calibration object is a uniform object, the plenoptic image is largely uniformly illuminated within each circular footprint and dark outside the footprint. The slice 510b in FIG. 5B goes through the center of all the footprints. If the footprints were perfectly touching, then the slice 510b would be a constant illumination with little variation because the dark regions between footprints would be minimized. In contrast, the slices 510a and 510c in FIGS. 5A and 5C pass through alternating regions of light and dark. Therefore, the frequency spectra 500a,c for slices 510a,c would have stronger components at the fundamental pitch frequency $f_p$ compared to the spectrum 500b for slice 510b.

Within the search band 340, there is one slice that has the lowest spectral power at the pitch frequency $f_p$. For example, the slice 510b may have the lowest spectral power. The slice within the search band that has the lowest spectral power is selected to be the centroid slice, and the offset of the centroid slice along the search direction determines 260 the centroid value along the search direction. In the example of FIG. 5, the search direction 342 is the y direction, so the y-value of centroid slice 510b is selected 260 as the y-value of the centroid point.

A similar process to that shown in FIG. 5 is conducted for a second search band in an orthogonal direction. The centroid slice for the first search band yields the y-value of the centroid. The centroid slice for the second search band yields the x-value of the centroid. Together, these yield the (x,y) coordinates of the centroid point. The centroid sensor is the sensor at this (x,y) location. The intersection between the centroid slices for the different search directions determine the centroid point and/or centroid sensor of the normalized plenoptic image.

While FIGS. 5A-5C show only three slices, the number of slices within the search band can be any number. Generally, the first slice is the slice closest to the edge of the search band. Subsequent slices are progressively closer to the opposite edge of the search band stepping in the search direction. The process concludes when slices are stepped along the search direction until the final slice is reached at the opposite edge of the search band. In addition, the search band does not have to be based on the central sensor as described above. Other approaches can be used to establish the search band so long as it encompasses a centroid location.

In FIGS. 5A-5C, the slices span a range of nine footprints starting at coordinate 520 and ending at coordinate 530. In different embodiments, the slices may have different lengths, ranging from spanning the entire sensor array to spanning a fraction of the sensor array to spanning a single footprint. The lengths of the slices can also be different for different search directions. Further the slices are not required to be orthogonal to the search direction. In addition, the system can compare any number of slices from any number of search bands to determine centroid slices. For example, there may be four search directions with twenty slices in each search direction or there may be three search directions with five slices in the first search direction, ten slices in the second search direction, and fifteen slices in the third search direction, etc.

Interpolation can also be used. For example, if the centroid point lies between sensors, the system can use interpolation of different sensors. Alternately, the system may just select the closest sensor. In addition, two or more slices within a search band may be interpolated to determine the centroid value for that search band, rather than simply selecting a single slice.

Different methodologies may be used to identify the centroid slice. Methodologies may include, for example, an iterative method, an exhaustive search, a gradient ascent, some other methodology that identifies a maximum/minimum value within a set of numbers, or some combination thereof.

Different criteria can also be used to identify the centroid slice. For example, the centroid slice may be identified as the slice with the percentage of footprint area compared to interstitial (i.e., non-footprint) area. Alternately, it may be identified as the slice with the highest total signal power.

Returning to FIG. 2, once the centroid of the normalized plenoptic image has been determined, the packing structure for the microlens array can also be determined 270. Possible packing structures include rectangularly packed and hexagonally packed.

Figure 6A:
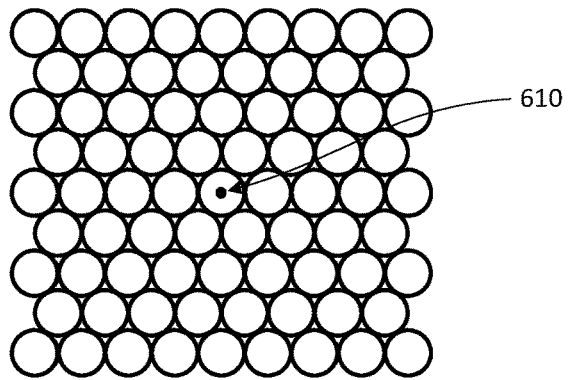
FIGS. 6A-6C illustrate automatic detection of a hexagonally packed microlens array, according to one example embodiment.
Figure 6B:
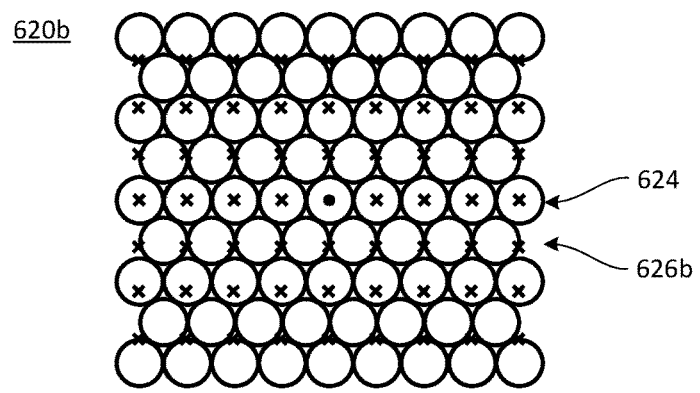
Figure 6C:
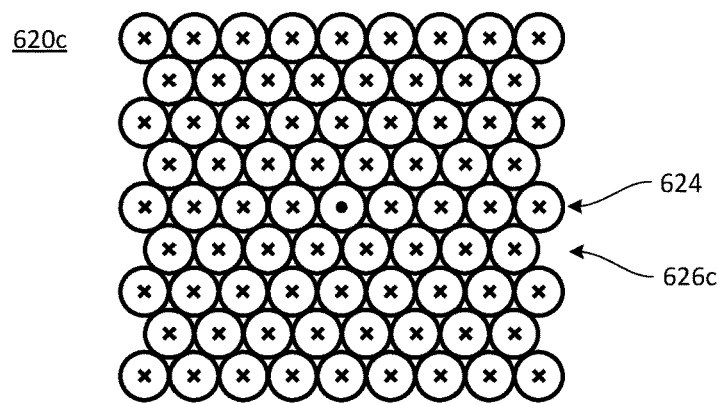
Figure 7A:
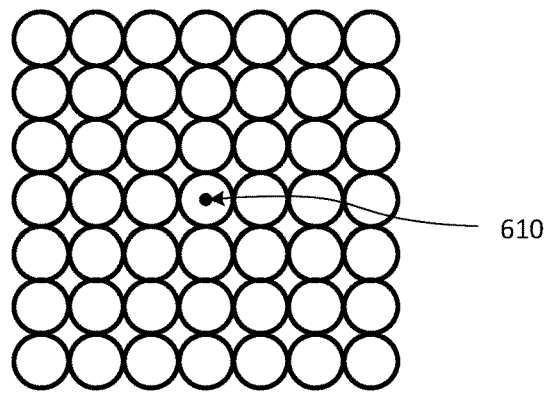
FIGS. 7A-7C illustrate automatic detection of a square packed microlens array, according to one example embodiment.
Figure 7B:
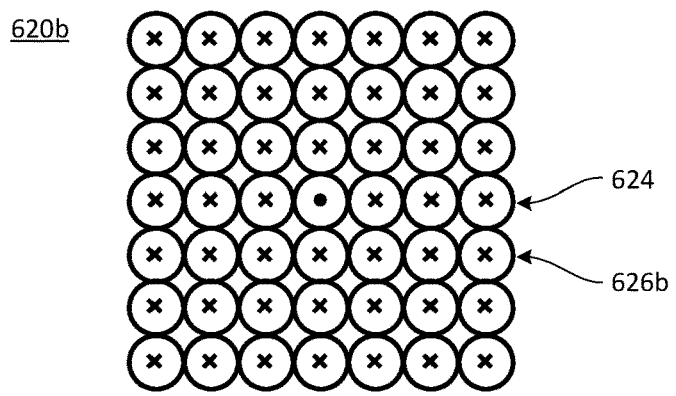
Figure 7C:
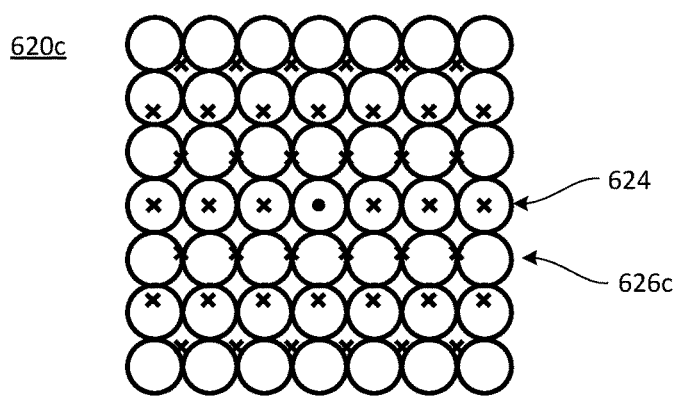

In one approach, candidate centroid arrays are generated for different packing structures and these are compared to the actual normalized plenoptic image to determine which packing structure is the actual one. FIGS. 6A-6C show an example where the actual packing structure is hexagonally packed. FIG. 6A shows the plenoptic image where the centroid 610 of one of the footprints has been located, for example using the process described above. The pitch is also known. In FIG. 6B, a candidate array 620b of centroids is generated based on square packing, using the known pitch. The x's in FIG. 6B indicate the calculated centroids. In FIG. 6C, a candidate array 620c of centroids is generated based on hexagonal packing, using the known pitch. The x's in FIG. 6B indicate the calculated centroids in the candidate array. These centroid arrays can be generated for the entire plenoptic image or for just a part of the image. For example, the centroid array could include just two adjacent rows 624, 626 as shown in FIGS. 6B and 6C. FIGS. 7A-7C show a similar example, but where the actual packing structure is square packed.

The system determines 270 the packing structure of the microlens array based on the candidate centroid arrays. In one approach, the system compares the signal power at the known centroid 610 to one of the neighbor centroids in the candidate array. If the signal energies are similar or more similar than for the other candidate arrays, then that candidate array is determined to be the correct packing structure.

In another embodiment, a summation (or average) of the signal power of a similar number of nearest neighbor centroids for each candidate array is calculated. For example, the system may compare the summed (or averaged) signal power of the three nearest neighbor centroids. The array with the highest summed or average signal power is determined to be the correct packing structure. In similar configurations, the system can compare any number of next nearest neighbor centroids. In particular, it is preferable to select centroids that behave differently between different packing structures.

In an alternate embodiment, the determination can be made by comparing slices 624, 626 of the candidate arrays. For example, the signal power of the known slice 624, i.e. the slice with the known centroid 610, can be represented as $$S_{reference} = \int_{x=0}^{iw} I(x)_{RS} dx \quad (1)$$

where dx is the pitch of the normalized footprints, I is the luminosity value, iw is the horizontal resolution of the image, and the subscript RS indicates the luminosity values of the slice of interest (e.g. known slice 624). Generally, $S_{reference}$ can be interpreted as the total signal power of the sensors on the row of sensors with the known centroid 610.

The signal power of the nearest neighbor slice 626b of a candidate array with a square packing can be represented as $$S_{square} = \int_{x=\varphi}^{iw} I(x)_{NNS} dx \quad (2)$$

where $\varphi$=iw modulo(dx), and the subscript NNS indicates the luminosity values are for the nearest neighbor slice of interest (e.g. nearest neighbor slice 626b) for square packing. Generally, $S_{square}$ can be interpreted as the total signal power of the nearest neighbor slice to the known slice in a plenoptic imaging system with square packing. The signal power of the nearest neighbor slice 626c of a packing array with a hexagonal packing can be represented as $$S_{hexagonal} = \int_{x=\tau}^{iw} I(x)_{NNH} dx \quad (3)$$

$\tau$=$\varphi$+dx/2, and NNH indicates the luminosity values are for the nearest neighbor slice of interest (e.g. nearest neighbor slice 626c) for hexagonal packing. Generally, $S_{hexagonal}$ can be interpreted as the total signal power of the nearest neighbor slice to the known slice in a plenoptic imaging system with square packing.

The signal power of the hexagonal packed slice 626c and the square packed slice 626b are compared to the known slice 610. If the signal power of the hexagonal packed slice is closer in value to the known slice than the rectangular packed slice, then the system determines the packing is hexagonal. If the inverse is true, then the system determines the packing is square.

Returning to FIG. 2, the system maps 280 the found centroids from the normalized plenoptic image back to the coordinate system of the raw plenoptic image. For example, in the normalization 220, the microlens footprints are scaled and rotated. The centroids (and packing structure) are determined 260, 270 in this normalized coordinate system. The inverse mapping can be used to transform the coordinates back to the actual coordinates of the sensor array.

Although the detailed description contains many specifics, these should not be construed as limiting the scope of the invention but merely as illustrating different examples and aspects of the invention. It should be appreciated that the scope of the invention includes other embodiments not discussed in detail above. For example, any size or arrangement of microlenses in a microlens array can be used in this method. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. For a plenoptic imaging system comprising imaging optics, a microlens array and a sensor array, the sensors in the sensor array capturing a plurality of views of an object, a method for estimating a centroid location on the sensor array, the sensor at the centroid location capturing a center view of the object, the method comprising:
   accessing a normalized plenoptic image of a calibration object;
   for a search direction, determining a search band along the search direction, the search band spanning a range of different values for the search direction;
   taking a plurality of slices of the normalized plenoptic image along a slice direction that is orthogonal to the search direction, each slice having a different value of the search direction within the search band; and
   selecting a centroid slice from among the plurality of slices based on a frequency component of the slices corresponding to a pitch of the microlens array projected onto the normalized plenoptic image, the selected centroid slice determining a centroid value for the search direction.

2. The method of claim 1, wherein selecting the centroid slice comprises selecting the slice with a frequency component corresponding to the pitch with a weakest total power.

3. The method of claim 1, wherein selecting the centroid slice comprises selecting the slice with a maximum total power.

4. The method of claim 1, wherein selecting the centroid slice comprises selecting the slice with a lowest fraction of interstitial area within the slice.

5. The method of claim 1, wherein each slice is a row of sensors in the normalized plenoptic image, taking a plurality of slices comprises taking a plurality of rows offset by different amounts along the search direction, and selecting a centroid slice comprises selecting a centroid row.

6. The method of claim 1, wherein the search band is between 1× and 2× the pitch.

7. The method of claim 1, wherein the search band is centered around a midpoint of the sensor array.

8. The method of claim 1, wherein the method further comprises:
   for a second search direction, determining a second search band along the second search direction, the second search band spanning a range of different values for the second search direction;
   taking a plurality of second slices of the normalized plenoptic image along a second slice direction that is orthogonal to the second search direction, each second slice having a different value of the second search direction within the second search band;
   selecting a second centroid slice from among the plurality of second slices based on a frequency component of the second slices corresponding to a second pitch of the microlens array projected onto the normalized plenoptic image, the selected second centroid slice determining a centroid value for the second search direction.

9. The method of claim 8, wherein a length of the slices along the two different search directions is different.

10. The method of claim 8, wherein selecting the centroid slices for the two different search directions is based on different criteria for each search direction.

11. The method of claim 1, wherein a mapping is applied to a raw plenoptic image to obtain the normalized plenoptic image, the method further comprising applying an inverse of the mapping to the centroid value to obtain a centroid relative to the raw plenoptic image.

12. The method of claim 1, further comprising:
   normalizing a raw plenoptic image to produce the normalized plenoptic image, wherein normalizing the raw plenoptic image comprises:
      analyzing the raw plenoptic image to determine a pitch between adjacent microlenses of the microlens array and a rotation of the microlens array relative to the sensor array, and
      adjusting the raw plenoptic image to compensate for the determined pitch and the determined rotation.

13. The method of claim 1, further comprising:
   generating candidate arrays of centroids based on different packing structures, the candidate arrays generated based on the determined centroid value and the pitch;
   analyzing the signal power for the different candidate arrays; and
   determining the packing structure of the microlens array based on the analysis of the signal powers.

14. The method of claim 13, wherein determining the packing structure of the microlens array distinguishes between a hexagonal packing and a rectangular packing.

15. The method of claim 1 wherein the slices span an entire row of sensors.

16. The method of claim 1 wherein the slices span a width of a single microlens.

17. The method of claim 1 wherein the slices span less than an entire row of sensors.

18. The method of claim 1 wherein the method is performed as part of a calibration process for the plenoptic imaging system.

19. A non-transitory computer-readable storage medium storing executable computer program instructions for estimating a centroid location on a sensor array from a plenoptic imaging system, the instructions executable by a processor and causing the processor to perform a method comprising:
   accessing a normalized plenoptic image of a calibration object;
   for a search direction, determining a search band along the search direction, the search band spanning a range of different values for the search direction;
   taking a plurality of slices of the normalized plenoptic image along a slice direction that is orthogonal to the search direction, each slice having a different value of the search direction within the search band; and
   selecting a centroid slice from among the plurality of slices based on a frequency component of the slices corresponding to a pitch of the microlens array projected onto the normalized plenoptic image, the selected centroid slice determining a centroid value for the search direction.

20. For a plenoptic imaging system comprising imaging optics, a microlens array and a sensor array, the sensors in the sensor array capturing a plurality of views of an object, a method for estimating a centroid location on the sensor array, the sensor at the centroid location capturing a center view of the object, the method comprising:

accessing a plenoptic image of a calibration object;

for a search direction, determining a search band along the search direction, the search band spanning a range of different values for the search direction;

taking a plurality of slices of the plenoptic image along a slice direction that is orthogonal to the search direction, each slice having a different value of the search direction within the search band; and selecting a centroid slice from among the plurality of slices based on a frequency component of the slices corresponding to a pitch of the microlens array projected onto the plenoptic image, the selected centroid slice determining a centroid value for the search direction.

\* \* \* \* \*